Figure 1:
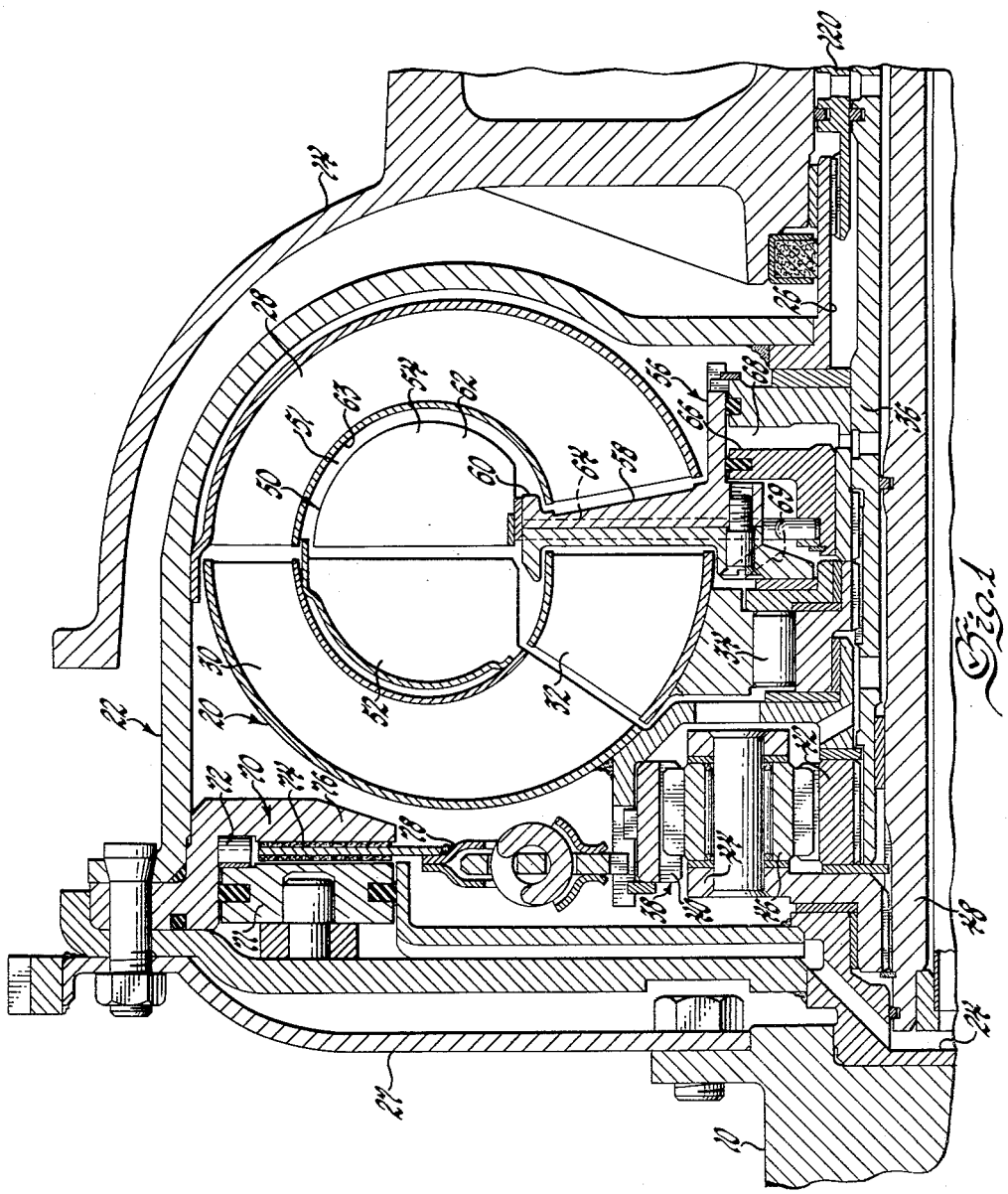
Figure 1C:
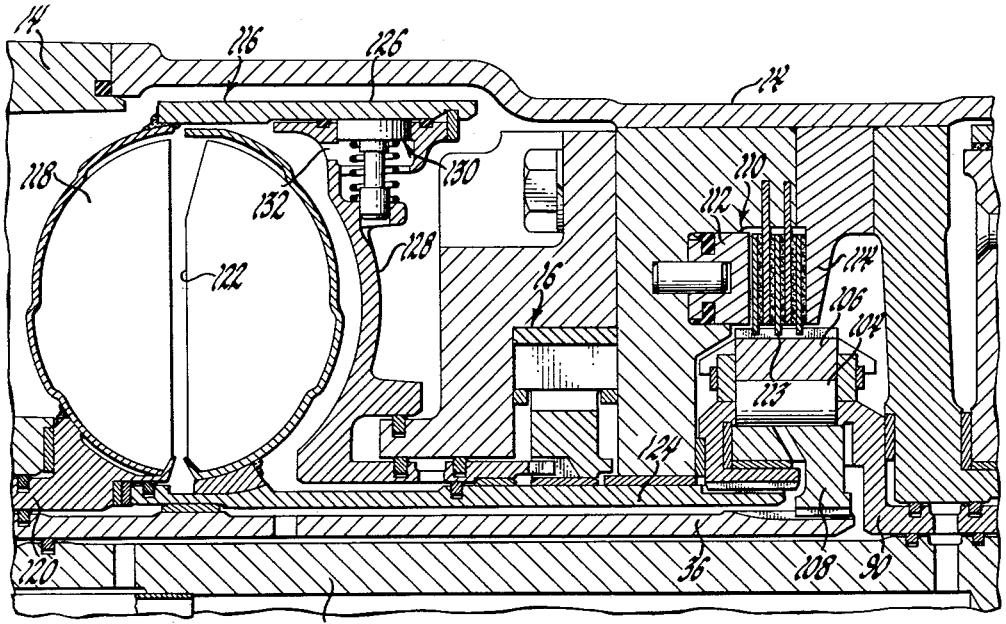

Aug. 15, 1961 — V. C. MOORE — 2,995,956
TRANSMISSION

Filed Nov. 25, 1957 — 2 Sheets-Sheet 1

INVENTOR.
Victor C. Moore
BY W. C. Middleton
ATTORNEY

INVENTOR.
Victor C. Moore
BY
W. C. Middleton
ATTORNEY

United States Patent Office 2,995,956
Patented Aug. 15, 1961

1

2,995,956
TRANSMISSION
Victor C. Moore, Plymouth, Mich., assignor to General Motors Corporation, Detroit, Mich., a corporation of Delaware
Filed Nov. 25, 1957, Ser. No. 698,513
27 Claims. (Cl. 74—688)

This invention relates to improvements in transmissions, particularly of the type employing hydrodynamic torque transmitting devices combinable with gearing and adpted for use, although not exclusively, in motor vehicles.

Among the advantages of hydrodynamic torque transmitting devices, e.g., torque converters, is the ability of the torque converter to vary drive ratios smoothly and in a relatively imperceptible manner. In motor vehicle transmissions, this advantage is important, but, with a torque converter, is somewhat offset by the lack of efficiency under certain conditions. Therefore, planetary gearing is often combined with the converter and arranged to shift between reduced and direct or substantially direct drive ratios. These shifts then present a problem since the ideal shift should not be discernible by the driver and should, in fact, occur in a manner analogous to the ratio changes through the converter.

With the foregoing in mind, the invention seeks to provide a novel transmission that is efficient in operation, that changes drive ratios smoothly and imperceptibly, and that is compactly and uniquely arranged to require a minimum space.

According to the invention, hydrodynamic torque transmitting devices are joined in a new way so as to utilize space normally available and afford an effective drive over a wide range of operation. Specifically, the invention combines these devices with gearing to obtain both the gear and hydrodynamic device drive ratios.

By the invention, a hydrodynamic device is positioned in the vortex chamber of another and both are combined with gearing, the blades of one devices being movable so as to produce a change in the ratio through the gearing. The hydrodynamic device with the movable blades, when effective, coperates with one-way means, which prevents rotation of the gear reaction element in one direction, to produce a shift or change in the drive ratio through the gearing.

Further, the invention contemplates controlling planetary gearing through the cooperation of a hydrodynamic torque transmitting device and one-way means so that during one shift, as the hydrodynamic device becomes effective, the one-way means will release the gearing reaction element gradually from restraint and during another, as the hydrodynamic device becomes ineffective, the one-way means will progressively commence to retard and eventually stop the gearing reaction element from rotation with neither shift producing any discernible shock or jar.

Other important aims of the invention are to render one hydroynamic device effective and ineffective, according to one form, by emptying and filling the device, and according to another form, by repositioning a series of moveable blades for the device.

In carrying out the invention, a hydrodynamic torque multiplying device, e.g., a torque converter, is arranged to transfer drive from a driving shaft through compounded planetary gearing to a driven shaft. A front planetary gear unit is driven directly by the torque converter and is joined with a rear planetary gear unit to afford four different drive ratios through the transmission. The reaction elements for the gear units are prevented from rotation in one direction by a one-way mechanism and a brake to provide a reduced drive through each while the gear units are locked up for substantially direct drive by individual hydrodynamic torque transmitting devices such as fluid couplings. The fluid coupling for the front unit is positioned within the vortex chamber of the torque converter and has the blades of one member movable relative to the working circuit so that the coupling can be rendered operative and inoperative as desired. When operative, the front unit attains approximately a direct drive status. The fluid coupling for the rear unit is filled with fluid when a direct drive is wanted and emptied to afford a reduced drive therethrough.

The transmission also includes a lock-up clutch which transfers drive directly from the driving shaft to the front gear unit, thus by-passing the torque converter and eliminating the fluid losses therethrough. In addition, engine braking, a positive neutral, and reverse drive are made available by the transmission.

Figure 1B:
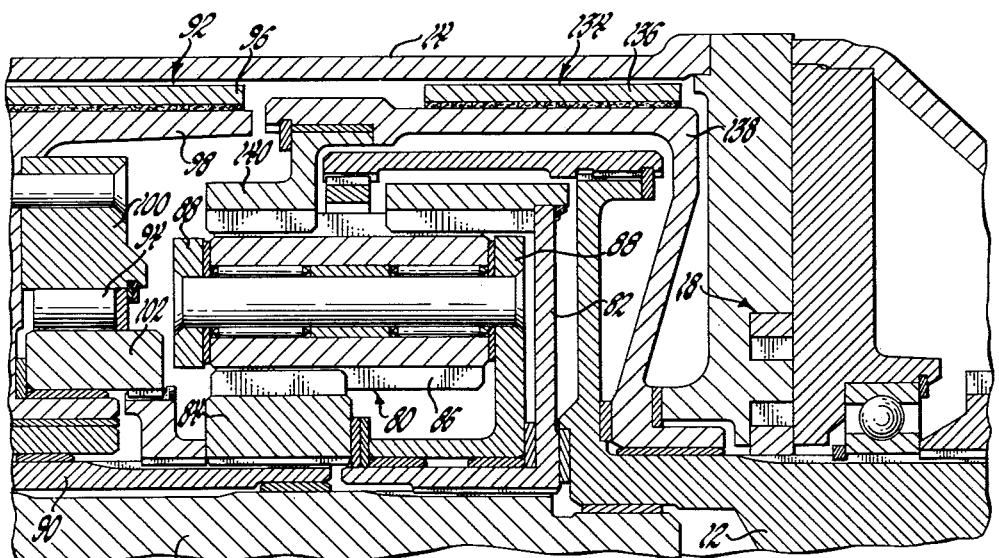

The foregoing and other objects and advantages of the invention will be apparent from the following description and from the accompanying drawings in which:

FIGURES 1, 1a and 1b are sectional views illustrating, respectively, the lefthand, central and righthand portions of a transmission demonstrating the principles of the invention.

Referring to the drawings, the numerals 10 and 12 designate, respectively, the driving and driven shafts for the transmission, the transmission being enclosed by a suitable casing 14. The driving shaft 10 may be the conventional vehicle engine crankshaft while the driven shaft may be connected to the vehicle wheels (not shown) in a known manner.

Fluid pressure for operating the various components of the transmission and appropriate controls therefor (not shown) is applied by a front pump 16 driven at the speed of the driving shaft 10, as will be apparent, and a rear pump 18 rotated at the speed of the driven shaft 12. These pumps may be of known construction utilizing vanes, gears, or the like.

Positioned adjacent to and rearwardly of the driving shaft 10 is a hydrodynamic torque transmitting device, such as the three member torque converter, denoted generally at 20. The converter 20 is enclosed by a torque converter housing 22 supported at the front by a hub portion 24 piloted in the end of the driving shaft 10 and rotatably mounted by the casing 14 at the back end by a rearwardly extending sleeve portion 26. Drive between the driving shaft 10 and the converter housing 22 is transferred hrough a flexplate 27 interposed therebetween. The torque converter 20, includes an impeller 28 attached at the outer end to the converter housing 22, a turbine 30 and a stator 32. The stator 32 is prevented from reverse rotation by a one-way mechanism 34 which is mounted between the stator 32 and a reaction shaft 36 restrained from reverse rotation, as will be explained. The one-way mechanism 34 and the others employed by the transmission may be of familiar construction utilizing one-way elements, such as sprags or rollers, to prevent relative rotation between two components in one direction and free rotation therebetween in the opposite sense. The members of the converter 20 all have suitably shaped blades and define a working circuit with the fluid being pumped by the impeller 28 so as to traverse a counter-clockwise path, as viewed in FIGURE 1, extending from the impeller exit through the turbine 30, the stator 32 and back to the impeller entrance.

Between the driving shaft 10 and the torque converter 20, a front planetary gear unit 38 is installed to receive drive from the torque converter 20 during one phase of operation, as will be described. The front unit 38 includes a ring gear 40 attached to the converter turbine 30, a reaction sun gear 42 splined to reaction shaft 36, and a planet carrier 44 having journaled thereon a series of planet pinions 46 that intermesh with gears 40 and 42. The planet carrier 44 is affixed to the front end of a main shaft 48 disposed within the hollow reaction shaft 36. With the ring gear 40 being driven forwards, the sun gear 42 will attempt to revolve backwards, which is prevented by the reaction shaft 36, and, therefore, drive will be transferred by the carrier 44 to the main shaft 48 at a reduced speed.

To lock up the front unit 38 for direct drive the ring gear 40 and the sun gear 42 are joined together by another hydrodynamic torque transmitting device, such as a front unit fluid coupling 50, shown positioned within a vortex chamber 51 defined by the members of the converter 20. The coupling 50 includes a pump 52 attached to the converter turbine 30, and a turbine 54 drive connected to the sun gear 42 by an annular cylinder 56 which is splined to the reaction shaft 36. The annular cylinder 56 has a series of spokes 58, shaped to offer minimum flow resistance, extending across the flow path of the converter 20 between the stator 32 and the impeller 28 and terminating in a circular wall 60. The turbine 54 has a series of movable blades 62 for which the inner wall or shroud 63 of the impeller 28 functions as an outer shroud. The clearances between the impeller shroud 63 and the blades 62 should be selected to insure efficient operation of the coupling 50. Blades 62 are supported on the annular wall 60 to which are attached crankpins 64 extending upwardly through the spokes 58. The lower crank ends of the crankpins 64 are connected to a piston 66 slidably mounted in the cylinder 56. Pressure fluid may be supplied, when desired, to a chamber 68 and urge the piston 66 and blades 62 to the torque transmitting or effective position illustrated against opposing converter charging pressure supplied from the converter 20 through the passages 69 to the left side of piston 66. When the fluid pressure in chamber 68 is relieved, converter pressure will move the piston 66 to the right and rotate the turbine blades 62 to the inoperative or ineffective position so that no torque can be transmitted by the coupling 50. A spring or any other known agency could be used as an equivalent for converter charging pressure, although converter pressure is readily and conveniently accessible. Consequently, when the fluid coupling 50 is operative, the blades 62 will be in the depicted position whereupon the ring gear 40 and the sun gear 42 will be rotated at substantially the same speed, the only difference in speeds being due to the inherent slippage through the coupling 50.

Since the torque converter 20 is inefficient for certain phases of operation, a lock-up clutch 70 is provided for transferring drive directly from the driving shaft 10 to the ring gear 40, thus by-passing the torque converter. The lock-up clutch 70 has a hydraulically actuated piston 71 that, when subjected to fluid pressure, will overcome the opposing biasing force from a wave type clutch release spring 72 and force a clutch plate 74 into frictional engagement with a backing plate 76 attached to the torque converter housing 22. With the lock-up clutch engaged, drive is transferred from the converter housing 22 through the backing plate 76, clutch plate 74, and a conventional vibration damper 78 to the ring gear 40.

As seen in FIGURE 1b, a rear planetary gear unit 80 is mounted at the back of the transmission and has an input ring gear 82 splined to the rear end of the main shaft 48. A reaction sun gear 84 for the unit along with the ring 82 mesh with a series of elongated pinions 86 journaled on a planet carrier 88, in turn, connected to the driven shaft 12. When the sun gear 84 is prevented from reverse rotation, forward rotation of the ring gear 82 will cause the planet carrier 88 and, accordingly, the driven shaft 12 to be rotated forwardly at a reduced speed.

For preventing reverse rotation of the rear unit reaction sun gear 84, a reaction brake, illustrated at 92, and a one-way mechanism 94 are utilized. The brake 92 comprises a hydraulically actuated band 96 that surrounds a brake drum 98 attached to an outer race 100 of the one-way device 94. An inner race 102 of the one-way mechanism 94 is connected to the sleeve shaft 90. When the reaction brake 92 is actuated, band 96 will engage the drum 98 and prevent rotation of the outer race 100 in either direction. The one-way mechanism 94 is arranged to resist reverse rotation only of the sleeve shaft 90 and, as a result, the rear unit sun gear 84, but will allow the sleeve shaft 90 to rotate forward freely.

The reaction brake 92 and one-way mechanism 94, also, hold the reaction shaft 36 and the front unit sun gear 42 against reverse rotation since the front end of the sleeve shaft 90 is connected through a one-way mechanism 104 to the rear end of the reaction shaft 36. An outer race 106 for the one-way mechanism 104 is joined to the sleeve shaft 90 while an inner race 108 is connected to the reaction shaft 36. One-way mechanism 104 is adjusted so that the reaction shaft 36 cannot rotate backwards relative to the sleeve shaft 90, but can rotate forwardly relative thereto without restraint. The purpose of the one-way mechanism 104 will be explained in the operational summary.

Because engine braking is desirable during certain phases of operation, particularly at low speeds, an overrun disk type brake 110 is provided comprising a hydraulically actuated piston 112 which, when operated, will compress the disks 113 against a backing member 114 and prevent the outer race 106 of the one-way mechanism 104 and the rear unit sun gear 84 from revolving in either direction relative to casing 14. This feature is probably best understood by assuming the driven shaft 12 is driving, e.g., during coast, then the sun gear 84 will attempt to rotate forwardly and, if unrestrained as it would be with only the one-way mechanism 104, the connection to the main shaft 48 and the driving shaft 10 would be broken and the engine could not offer any resistance for slowing down the vehicle.

To change the drive ratio through the rear unit 80 from under drive to one approximating a direct drive, still another hydrodynamic torque transmitting device is employed, such as the rear unit fluid coupling, indicated generally at 116. This coupling 116 has a pump 118 with a hub part 120 splined to the sleeve 26 of the torque converter housing 22 and a turbine 122 connected through a shaft extension 124 to the outer race 106 of one-way mechanism 104. A rearwardly extending drum part 126 is secured to a cover 128 partially surrounding the turbine 122 to supply a fluid tight enclosure for the coupling 116. The cover 128 is connected to and drives the front pump 16 at the speed of the driving shaft 10. A series of exhaust valves 130 are positioned in the cover 128 and control exhaust passages 132. These valves 130 are the subject matter of a prior application, Cheek, S.N. 477,682, filed December 27, 1954, which issued December 15, 1959, as Patent 2,916,881. Briefly, to drain the coupling 116, the exhaust valves 130 are arranged to open the exhaust passages 32 due to the combined spring and centrifugal forces acting thereon. To fill the coupling 116, an external force, which may be fluid pressure, moves the valves 130 downwardly and the exhaust passages 132 are closed. As the coupling 116 fills, the pump 118 being connected to the drive shaft 10, will through the agency of the fluid, start rotation of the turbine 122. Since the turbine 122 is connected by the shaft extension 124, the outer race 106 of the one-way mechanism 104, and the sleeve shaft 90, to the rear unit sun gear 84, the sun gear 84 will be rotated at nearly the same speed as the driving shaft 10, a slight difference in speeds being due to the inherent slippage in the coupling 116. With the ring gear 82 rotating at, or approximately, the same speed as the driving shaft 10, determined by whether the torque converter 20 is driving or the lock-up clutch 70 is engaged, the rear unit 80 will be transferring drive to the driven shaft 12 at a substantially direct drive ratio.

In order to drive the driven shaft 12 in a reverse direction, a reverse brake, indicated generally at 134, is furnished to hold a reverse ring gear 140 meshing with the rear unit planet pinions 86 from rotation in either direction. The brake 134 employs a hydraulically actuated brake band 136 for engaging a brake drum 138 rotatably supported on the driven shaft 12 and connected to the reverse ring gear 140. When the reverse brake 134 is engaged, assuming the reaction brake 92 is released, both the reverse ring gear 140 and the ring gear 82, since they have identical tooth members, will be prevented from rotation. With ring gear 82 stationary, the front unit carrier 44 cannot rotate and, therefore, forward rotation of the front unit ring gear 40 will cause the front unit sun gear 42 to rotate backwards and carry with it the reaction shaft 36. As explained, the one-way mechanism 104 prevents reverse rotation of the reaction shaft 36 relative to the sleeve shaft 90. Consequently, the rear unit sun gear 84 for the reverse unit will be driven backwards causing the rear unit carrier 88 and the driven shaft 12 to be driven at a reduced speed in a reverse direction.

The operation of the transmission is as follows:

The neutral status of the transmission is achieved by disengaging both the overrun brake 110 and the reaction brake 92 which, as previously described, eliminates the restraining force resisting backward rotation of both the front and rear unit reaction gears 42 and 84, by draining the rear unit coupling 116 and by rotating the front unit coupling turbine blades 62 to the inoperative position. No drive can then be transferred between the driving and driven shafts 10 and 12.

To condition the transmission for forward drive, the reaction brake 92 must first be engaged. Then, with the brake 92 engaged, the front unit coupling blades 62 in the inoperative position, the rear unit coupling 116 emptied, and the lock-up clutch 70 disengaged, drive will be transferred from the ddiving shaft 10 through the torque converter 20 to the front unit 38. Because the front unit sun gear 42 cannot rotate backwards, the front unit carrier 44, the main shaft 48, and the rear unit ring gear 80 will all be driven at a reduced speed. The rear unit 80 is likewise in reduction, since the rear unit sun gear 84 cannot rotate backwards and the driven shaft 12 will be driven in first speed at an overall ratio, determined by both the front and rear units 38 and 80, and the torque multiplication provided by the torque converter 20.

Second speed through the transmission is established when the lock-up clutch 70 is engaged so that the torque converter 20 is by-passed and eliminated from the drive train. The drive ratio now is determined entirely by the two units 38 and 80.

To obtain third speed, the front unit coupling turbine movable blades 62 are moved to the operative position and the front gear unit 38 then will be driving the rear unit ring gear 82 at substantially the same speed as the driving shaft 10. The one-way mechanism 104 allows the reaction shaft 36 and the front unit reaction sun gear 42 to rotate forward while the sleeve shaft 90 and rear unit reaction sun gear 84 are held by the reaction brake 92 and one-way device 94. Because the rear gear unit 80 is still in reduction drive, the driven shaft 12 will be driven at a ratio determined solely by the rear unit.

For fourth speed, the rear unit coupling 116 is filled with fluid, thus causing the rear unit sun gear 84 to be rotated at nearly the same speed as the rear unit ring gear 82 and both the front and rear units 38 and 80 will be conditioned for what approximates a direct drive.

Reverse through the transmission, as aforementioned, is established by the reverse brake 134 which, when engaged, will cause the driven shaft 12 to be rotated at reduced speed in a reverse direction. The front unit coupling 50 and the rear unit coupling 16 are both inoperative and the lockup clutch 70 is disengaged so that the maximum ratio can be obtained by compounding the front and rear units 38 and 80 with the torque converter 20.

Preferably, the overrun brake 110 is engaged in reverse and first and second speed drives so that engine braking is available for low vehicle speeds.

From the foregoing, it will be noted that the various units for the transmission are advantageously arranged so as to require a minimum space both longitudinally and radially. Furthermore, the fluid couplings and the torque converter together with the gearing furnish four distinct gear ratios plus in first speed the multiplication from the torque converter. The shift from one ratio to another through the gearing only requires that the fluid couplings associated with the particular gear unit be rendered operative. When the fluid couplings start to drive, the one-way mechanisms holding the reaction elements for the gearing gradually and automatically release with any shocks or jars being absorbed by the fluid in the coupling. As a result a smooth, but positive ratio change is acquired. In addition, the torque converter is operative only in the first speed, thereby permitting the vehicle to be stationary without creep or interruption of the drive train as well as affording the maximum starting ratio.

The invention is to be limited only by the following claims.

I claim:

1. In a variable speed drive, the combination of an input, a plurality of outputs, a hydrodynamic torque transmitting device including an impeller member connected to the input and a turbine member connected to one of the plurality of outputs, the members defining a vortex chamber therebetween, and means disposed in the vortex chamber both for transmitting torque and interrupting the transmission of torque between the device and another of the plurality of outputs.

2. In a variable speed drive, the combination of an input, a plurality of outputs, a first hydrodynamic torque transmitting device including an impeller member connected to the input and a turbine member connected to one of the plurality of outputs, the members defining a vortex chamber therebetween, and a second hydrodynamic torque transmitting device disposed in the vortex chamber and including an impeller connected to one of the members of the first device and a turbine connected to another of the plurality of outputs.

3. In a variable speed drive, the combination of an input, a plurality of outputs, a first hydrodynamic torque transmitting device including an impeller member connected to the input and a turbine member connected to one of the plurality of outputs, the members defining a vortex chamber therebetween, and a second hydrodynamic torque transmitting device disposed in the vortex chamber and including an impeller member connected to one of the members of the first device and a turbine member connected to another of the plurality of outputs one of the second device members having blades movable to different positions for varying the torque transmitting ability of the second device.

4. In a variable speed drive, the combination of an input, a plurality of outputs, a first hydrodynamic torque transmitting device including an impeller member connected to the input and a turbine member connected to one of the plurality of outputs, the members defining a vortex chamber therebetween, a second hydrodynamic torque transmitting device disposed in the vortex chamber and including an impeller connected to one of the members of the first device and a turbine connected to another of the plurality of outputs, the second device turbine having blades movable to different positions, and means for changing the positions of the movable blades to vary the torque transmitting ability of the second device.

5. In a variable speed drive, the combination of an input, a plurality of outputs, a first hydrodynamic torque transmitting device including an impeller member connected to the input and a turbine member connected to one of the plurality of outputs, the members defining a vortex chamber therebetween, a second hydrodynamic torque transmitting device disposed in the vortex chamber and including an impeller connected to the first device turbine member and a turbine connected to another of the plurality of outputs, the second device turbine having blades movable to different positions, and means for changing the positions of the movable blades to vary the torque transmitting ability of the second device.

6. In a variable speed drive, the combination of an input, a plurality of outputs, a torque converter including impeller, turbine, and stator members defining a vortex chamber therebetween, the impeller member being connected to the input and the turbine member being connected to one of the plurality of outputs, a fluid coupling disposed in the vortex chamber and including an impeller connected to the torque converter turbine member and a turbine connected to another of the plurality of outputs, the fluid coupling turbine having blades movable to different positions, and an expansible chamber motor for changing the positions of the movable blades to vary the torque transmitting ability of the fluid coupling.

7. In a transmission; the combination of driving and driven shafts; a first hydrodynamic torque transmitting device including an impeller member connected to the driving shaft and a turbine member; the members defining a vortex chamber therebetween; planetary gearing including an input element connected to the first device turbine member, a driven element connected to the driven shaft, and a reaction element prevented from rotation in one direction to provide one drive ratio through the gearing; and means disposed in the vortex chamber operable to transfer torque between one of the first device members and one of the elements of the gearing to provide another drive ratio through the gearing.

8. In a transmission; the combination of driving and driven shafts; a first hydrodynamic torque transmitting device including an impeller member connected to the driving shaft and a turbine member; the members defining a vortex chamber therebetween; planetary gearing including an input element connected to the first device turbine member, an output element connected to the driven shaft, and a reaction element prevented from rotation in one direction to provide one drive ratio through the gearing; and a second hydrodynamic torque transmitting device disposed in the vortex chamber and including an impeller connected to one of the first device members and a turbine connected to one of the elements of the gearing; the second hydrodynamic torque transmitting device being operable to provide another drive ratio through the gearing.

9. In a transmission; the combination of driving and driven shafts; a first hydrodynamic torque transmitting device including an impeller member connected to the driving shaft and a turbine member; the members defining a vortex chamber therebetween; planetary gearing including an input element connected to the first device turbine member, an output element connected to the driven shaft, and a reaction element prevented from rotation in one direction to provide one drive ratio through the gearing; and a second hydrodynamic torque transmitting device disposed in the vortex chamber and including an impeller member connected to one of the first device members and a turbine member connected to one of the elements of the gearing; one of the second device members having blades movable to different positions to vary the torque transmitting ability of the second device so as to provide another drive ratio through the gearing.

10. In a transmission; the combination of driving and driven shafts; a first hydrodynamic torque transmitting device including an impeller member connected to the driving shaft and a turbine member; the members defining a vortex chamber therebetween; planetary gearing including an input element connected to the first device turbine member, an output element connected to the driven shaft and a reaction element prevented from rotation in one direction to provide one drive ratio through the gearing; a second hydrodynamic torque transmitting device disposed in the vortex chamber and including an impeller connected to one of the first device members and a turbine connected to one of the elements of the gearing; the second device turbine having blades movable to different positions; and means for changing the position of the movable blades to vary the torque transmitting ability of the second device so as to provide another drive ratio through the gearing.

11. In a transmission; the combination of driving and driven shafts; a first hydrodynamic torque transmitting device including an impeller member connected to the driving shaft and a turbine member; the members defining a vortex chamber therebetween; planetary gearing including an input element connected to the first device turbine member, an output element connected to the driven shaft, and a reaction element prevented from rotation in one direction to provide one drive ratio through the gearing; a second hydrodynamic torque transmitting device disposed in the vortex chamber and including an impeller connected to the first device turbine member and a turbine connected to the reaction element of the gearing; the second device turbine having blades movable to different positions; and means for changing the positions of the movable blades to vary the torque transmitting ability of the second device so as to provide another drive ratio to the gearing.

12. In a transmission; the combination of driving and driven shafts; a first hydrodynamic torque transmitting device including an impeller member connected to the input and a turbine member; the members defining a vortex chamber therebetween; planetary gearing including a ring gear connected to the first device turbine member, a sun gear, and a planet carrier connected to the driven shaft and having a pinion journaled thereon intermeshing with the sun and ring gears; the sun gear being prevented from rotation in one direction to provide one drive ratio through the gearing; a second hydrodynamic torque transmitting device disposed in the vortex chamber and including an impeller connected to the first device turbine member and a turbine connected to the sun gear; the second device turbine having blades movable to different positions; and means for changing the position of the movable blades to vary the torque transmitting ability of the second device so as to provide another drive ratio through the gearing.

13. In a transmission; the combination of driving and driven shafts; a torque converter including an impeller member connected to the input, a turbine member, and a stator member restrained from rotation in one direction; the members defining a vortex chamber therebetween; planetary gearing including a ring gear connected to the torque converter turbine member, a sun gear, and a planet carrier connected to the driven shaftt and having a pinion journaled thereon intermeshing with the ring and sun gears; the sun gear being prevented from rotation in one direction to provide one drive ratio through the gearing; a fluid coupling disposed in the vortex chamber and including an impeller connected to the torque converter turbine member and a turbine connected to the sun gear; the fluid coupling turbine having blades movable to different positions; and an expansible chamber motor for changing the positions of the movable blades to vary the torque transmitting ability of the fluid coupling so as to provide another drive ratio through the gearing.

14. In a transmission; the combination of driving and driven shafts; a first hydrodynamic torque transmitting device including an impeller member connected to the driving shaft and a turbine member; the members defining a vortex chamber therebetween; planetary gearing including an input element connected to the first device turbine member, an output element connected to the driven shaft, and a reaction element prevented from rotation in one direction to provide one drive ratio through the gearing; a second hydrodrynamic torque transmitting device disposed in the vortex chamber and including an impeller connected to the first device turbine member and a turbine connected to the reaction element of the gearing; the second device turbine having blades movable to different positions; means for changing the positions of the movable blades to vary the torque transmitting ability of the second device so as to provide another drive ratio to the gearing; and means for connecting the input element of the gearing directly to the driving shaft.

15. In a transmission; the combination of driving and driven shafts; a first hydrodynamic torque transmitting device including an impeller member connected to the driving shaft and a turbine member; the members defining a vortex chamber therebetween; a first planetary gear unit comprising an input element connected to the turbine member, an output element, and a reaction element; a second planetary gear unit comprising an input element connected to the first gear unit output element, an output element connected to the driven shaft, and a reaction element; means for preventing rotation of the first and second gear unit reaction elements in one direction to afford one drive ratio through each of the gear units; a second hydrodynamic torque transmitting device disposed in the vortex chamber of the first device and including an impeller member connected to one of the first device members and a turbine member connected to one of the elements of the firstt gear unit; one of the second device members having blades movable to different positions to vary the torque transmitting ability of the second device so as to provide a different drive ratio through the first planetary gear unit; and means for changing the drive ratio through the second gear unit.

16. In a transmission; the combination of driving and driven shafts; a first hydrodynamic transmitting device including an impeller member connected to the driving shaft and a turbine member; the members defining a vortex chamber therebetween; a first planetary gear unit comprising an input element connected to the turbine member, an output element, and a reaction element; a second planetary gear unit comprising an input element connected to the first gear unit output element, an output element connected to the driven shaft, and a reaction element; means for preventing rotation of the first and second gear unit reaction elements in one direction to afford one drive ratio through each of the gear units; a second hydrodynamic torque transmitting device disposed in the vortex chamber of the first device and including an impeller member connected to one of the first device members and a turbine member connected to one of the elements of the first gear unit; one of the second device members having blades movable to different positions; means for changing the positions of the movable blades to vary the torque transmitting ability of the second device so as to provide a different drive ratio through the first planetary gear unit; and means for connecting the driving shaft to one of the elements of the second gear unit to furnish a different drive ratio through the second gear unit.

17. In a transmission; the combination of driving and driven shafts; a first hydrodynamic torque transmitting device including an impeller member connected to the driving shaft and a turbine member; the members defining a vortex chamber therebetween; a first planetary gear unit comprising an input element connected to the turbine member, an output element, and a reaction element; a second planetary gear unit comprising an input element connected to the first gear unit output element, an output element connected to the driven shaft, and a reaction element; means for preventing rotation of the first and second gear unit reaction elements in one direction to afford one drive ratio through each of the gear units; a second hydrodynamic torque transmitting device disposed in the vortex chamber of the first device and including an impeller connected to one of the first device turbine members and a turbine connected to the reaction element of the first gear unit; the second device turbine member having blades movable to different positions; means for changing the position of the movable blades to vary the torque transmitting ability of the second device so as to provide a different drive ratio through the first planetary gear unit; means for connecting the driving shaft to one of the elements of the second gear unit to furnish a different drive ratio through the second gear unit; and means for conecting the input element of the first gear unit directly to the driving shaft.

18. In a transmission; the combination of driving and driven shafts; a first hydrodynamic torque transmitting device including an impeller member connected to the driving shaft and a turbine member; the members defining a vortex chamber therebetween; a first planetary gear unit comprising a ring gear connected to the turbine member, a reaction sun gear, and a planet carrier having a pinion journaled thereon intermeshing with the ring and sun gears; a second planetary gear unit comprising a ring gear connected to the first gear unit planet carrier, a reaction sun gear, and a planet carrier connected to driven shaft and having a pinion journaled thereon intermeshing with the ring and sun gears; a brake for preventing rotation of the first and second gear unit reaction gears in one direction to afford one drive ratio through each of the gear units; a second hydrodynamic torque transmitting device disposed in the vortex chamber of the first device and including an impeller connected to the first device turbine member and a turbine connected to the first gear unit reaction gear; the second device turbine member having blades movable to different positions; means for changing the position of the movable blades to vary the torque transmitting ability of the second device so as to provide another drive ratio through the first gear unit; and a third hydrodynamic torque transmitting device including an impeller connected to the driving shaft and a turbine connected to the reaction element of the second gear unit; the third hydrodynamic device, when filled with fluid, rotating the second gear unit reaction gear forwardly to provide another drive ratio through the second gear unit.

19. In a transmission, the combination of driving and driven shafts; a first hydrodynamic torque transmitting device including an impeller member connected to the driving shaft and a turbine member; the members defining a vortex chamber therebetween; a first planetary gear unit comprising a ring gear connected to the turbine member, a reaction sun gear, and a planet carrier having a pinion journaled thereon intermeshing with the ring and sun gears; a second planetary gear unit comprising a ring gear connected to the first gear unit planet carrier, a reaction sun gear, and a planet carrier connected to the driven shaft and having a pinion journaled thereon intermeshing with the ring and sun gears; a brake for preventing rotation of the first and second gear unit reaction gears in one direction to afford one drive ratio through each of the gear units; a second hydrodynamic torque transmitting device disposed in the vortex chamber of the first device and including an impeller connected to the first device turbine member and a turbine connected to the first gear unit reaction gear; the second device turbine having blades movable to different positions; means for changing the position of the movable blades to vary the torque transmitting ability of the second device so as to provide another drive ratio through the first gear unit; a third hydrodynamic torque transmitting device including an impeller connected to the driving shaft and a turbine connected to the reaction gear of the second gear unit; the third hydrodynamic device, when filled with fluid, rotating the second gear unit reaction gear forwardly to provide another drive ratio through the second gear unit; and a clutch interposed between the driving shaft and the first gear unit ring gear arranged to by-pass the first device and transfer drive directly to the first gear unit.

20. In a transmission; the combination of driving and driven shafts; a torque converter including an impeller member connected to the driving shaft, a turbine member, and a stator held against reverse rotation; the members defining a vortex chamber therebetween; a first planetary gear unit comprising a ring gear connected to the turbine member, a reaction sun gear, and a planet carrier having a pinion jouraled thereon intermeshing with the ring and sun gears; a second planetary gear unit comprising a ring gear connected to the first gear unit planet carrier, a reaction sun gear, and a planet carrier connected to the driven shaft and having a pinion journaled thereon intermeshing with the ring and sun gears; a one-way mechanism for preventing rotation of the first and second gear unit reaction gears in one direction to afford one drive ratio through each of the gear units; a fluid coupling disposed in the vortex chamber of the first device and including an impeller connected to the torque converter turbine member and a turbine connected to the first gear unit reaction gear; the fluid coupling turbine having blades movable to different positions; an expansible chamber motor for changing the position of the movable blades to vary the torque transmitting ability of the second device so as to provide another drive ratio through the first gear unit; another fluid coupling including an impeller connected to the driving shaft and a turbine connected to the reaction gear of the second gear unit; the said another fluid coupling, when filled with fluid, rotating the second gear unit reaction gear forwardly to provide another drive ratio through the second gear unit; and a lock-up clutch interposed between the driving shaft and the first gear unit ring gear arranged to by-pass the first device and transfer drive directly to the first gear unit.

21. In a transmission; the combination of driving and driven shafts; a first hydrodynamic torque transmitting device including an impeller member connected to the input and a turbine member; the members defining a vortex chamber therebetween; planetary gearing including an input gear connected to the first device turbine member, a reaction gear, and a planet carrier connected to the driven shaft and having a pinion journaled thereon intermeshing with the input and reaction gears; the reaction gear being prevented from rotation in one direction to provide one drive ratio through the gearing; and a second hydrodynamic torque transmitting device disposed in the vortex chamber and including an impeller element connected to the first device turbine member and a turbine element connected to the reaction gear; one of the second device elements having blades movable to different positions to vary the torque transmitting ability of the second device so as to provide another drive ratio through the gearing.

22. In a transmission; the combination of driving and driven shafts; a first hydrodynamic torque transmitting device including an impeller member connected to the input and a turbine member; the members defining a vortex chamber therebetween; planetary gearing including an input gear connected to the first device turbine member, a reaction gear, and a planet carrier connected to the driven shaft and having a pinion journaled thereon intermeshing with the input and reaction gears; the reaction gear being prevented from rotation in one direction to provide one drive ratio through the gearing; a second hydrodynamic torque transmitting device disposed in the vortex chamber and including an impeller connected to the first device turbine member and a turbine connected to the reaction gear; the second device turbine having blades movable to different positions; and means for changing the position of the movable blades to vary the torque transmitting ability of the second device so as to provide another drive ratio through the gearing.

23. In a transmission; the combination of driving and driven shafts; a first planetary gear unit comprising an input element rotatable by the driving shaft, an output element, and a reaction element; a second planetary gear unit comprising an input element rotatable by the first gear unit output element, an output element rotatable with the driven shaft, a reaction element, and another element connected to the first gear unit reaction element; and brake means operative for preventing rotation of the second gear unit reaction elements; the second gear unit elements being arranged so that with the reaction element held said another element and accordingly the first gear unit reaction element are also prevented from rotation and forward rotation of the first gear unit input element by the driving shaft will cause the second gear unit output to revolve the driven shaft backwards.

24. In a transmission; the combination of driving and driven shafts; a first planetary gear unit comprising an input gear rotatable by the driving shaft, an output gear, and a planet carrier having a pinion journaled thereon intermeshing with the input and output gears; a second planetary gear unit comprising a first gear connected to the first gear unit planet carrier, a second gear having the same number of teeth as the first gear, a third gear rotatable with the first gear unit output gear, and a planet carrier rotatable with the driven shaft and having a pinion journaled thereon meshing with each of the first, second and third gears; and brake means for preventing rotation of the second gear so that accordingly the first gear and the first gear unit planet carrier are held and forward rotation of the first gear unit input gear by the driving shaft will cause the second gear unit planet carrier to revolve the driven shaft backwards.

25. In a transmission; the combination of driving and driven shafts; a first planetary gear unit comprising a ring gear rotatable by the driving shaft, a sun gear, and a planet carrier having a pinion journaled thereon intermeshing with the ring and sun gears; a second planetary gear unit comprising a first ring gear connected to the first gear unit planet carrier, a second ring gear having the same number of teeth as the first ring gear, a sun gear rotatable with the first gear unit sun gear, and a planet carrier rotatable with the driven shaft and having a pinion journaled thereon intermeshing with the sun and both ring gears; and brake means for preventing rotation of the second ring gear so that accordingly the first ring gear and the first gear unit planet carrier are held and forward rotation of the first gear unit ring gear by the driving shaft will cause the second gear unit planet carrier to revolve the driven shaft backwards.

26. In a variable speed drive, the combination of an input, a plurality of outputs, a hydrodynamic torque transmitting device including an impeller member connected to the input and a turbine member connected to one of the plurality of outputs, the members defining a vortex chamber therebetween, torque transmitting means disposed in the vortex chamber, the torque transmitting means including driving and driven elements drive connected respectively to one of the members of the device and another of the plurality of outputs, and means rendering the torque transmitting means operative and inoperative to transmit torque between the device and said another of the plurality of outputs.

27. In a variaable speed drive, the combination of an input, a plurality of outputs, a hydrodynamic torque transmitting device including an impeller member connected to the input and a turbine member connected to one of the plurality of outputs, the members defining a vortex chamber therebetween, means disposed in the vortex chamber both for transmitting and interrupting the transmission of torque between the device and another of the plurality of outputs, and means varying the torque transmitting ability of the means disposed in the vortex chamber.

References Cited in the file of this patent

UNITED STATES PATENTS

| | | |
|---|---|---|
| 2,179,149 | Gruenberger | Nov. 7, 1939 |
| 2,184,606 | De Lavaud | Dec. 26, 1939 |
| 2,651,918 | Kelley et al. | Sept. 15, 1953 |
| 2,672,763 | Limon et al. | Mar. 23, 1954 |
| 2,777,550 | Forster | Jan. 15, 1957 |
| 2,821,095 | Kelley | Jan. 28, 1958 |
| 2,889,715 | De Lorean | June 9, 1959 |